June 23, 1931.  G. C. LEWIS  1,810,918
MANUFACTURE OF CARBON BLACK
Filed Jan. 14, 1928
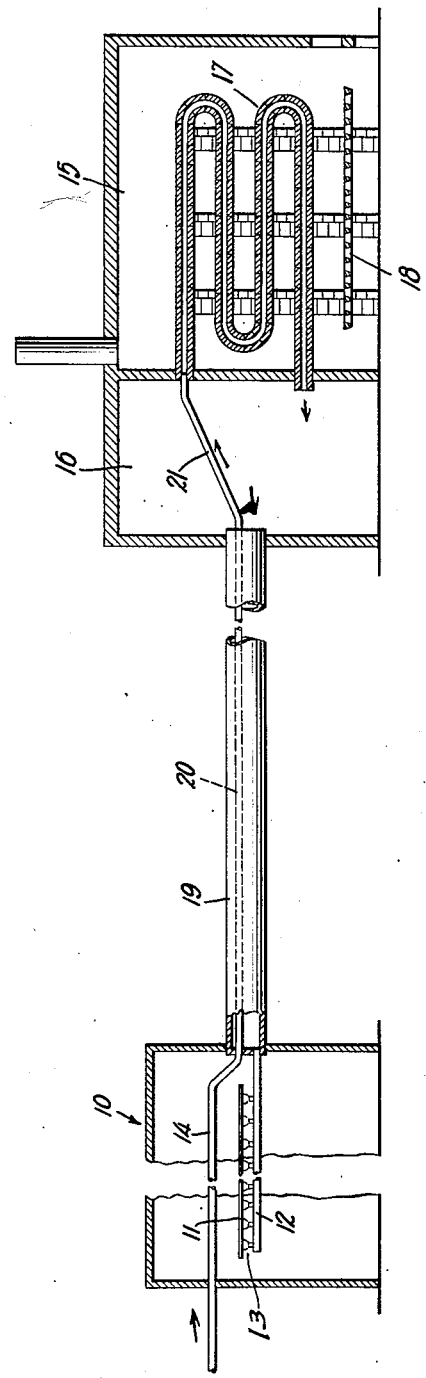
INVENTOR
George C. Lewis
BY
Dean Fairbank Albrecht & Hirsch
ATTORNEYS Patented June 23, 1931

1,810,918

UNITED STATES PATENT OFFICE

GEORGE CHARLES LEWIS, OF NEW DORP, NEW YORK, ASSIGNOR TO COLUMBIAN CARBON COMPANY, OF NEW YORK, N. Y., A CORPORATION OF DELAWARE

MANUFACTURE OF CARBON BLACK

Application filed January 14, 1928. Serial No. 246,750.

It is well known that the carbon black produced by the burning of a hydrocarbon gas, such as natural gas, and impinging the flame on a metal plate, has certain characteristics which cannot be obtained in any other manner. Although the yield of carbon black produced in this manner is very small in respect to the maximum carbon content of the gas burned, there is very large demand for this particular kind or grade because of the distinguishing characteristics which render it highly desirable in certain industries, and for certain uses.

The main object of the present invention is to increase the yield obtained from any given hydrocarbon gas when burned in the usual manner, and with the usual apparatus with the flame impinging upon a metal plate.

By means of my invention I am able to secure this object without the loss or modification of those properties which distinguish carbon black produced by impinging a flame on a plate, from carbons produced in any other manner.

It is known that by heating the gas to a very high temperature, such for instance as 1000° C. to 1200° C., a decomposition can be effected and a comparatively large yield of carbon will be deposited, but this is not carbon black as known in the art—it being of a grayish hue, soft and of extremely low tinctorial strength.

I have discovered that by heating the gas to a high temperature, but not to the point at which carbon will be freed and separated out, thereafter cooling the gas, but not to the point at which polymerized hydrocarbon products produced by such heating action will condense or separate out, and then burning this increased volume of hydrocarbons, the gaseous mixture resulting from the heating and cooling, the quality or kind of carbon black which will collect on the plate against which the flame impinges, will be the same as that obtained if untreated gas be burned, but the quantity will be very much greater.

The heating causes the molecules of the methane or other hydrocarbon gas to break up or change into free hydrogen and various new and heavier hydrocarbon compounds principally of the aromatic series in which the carbon is held less firmly or in less stable combination, and from which it is freed and deposited on the plate in very large quantities instead of uniting with oxygen and passing off as a gaseous product of the combustion.

The same heating of the gas to form the less stable but uncondensed hydrocarbons may also be employed to secure an increased yield of lamp black when the gaseous products of such heating are burned in a chamber to give a smoky flame by reason of the insufficient supply of oxygen.

The heating of the gas which forms an important part of my invention is not the ordinary preheating to which the gas is often subjected in the ordinary manufacture of carbon black, but breaking up of the gas under conditions which result in the formation of hydrogen and hydrocarbons of the aromatic series from benzine to anthracine. The condensation of these compounds is prevented and they are all carried to the burner in vapor form with the unchanged residue of the original gas and the hydrogen and other gas which may result from the reaction, and burned under conditions resulting in incomplete combustion. There are a wide variety of these compounds formed by the heating, including many of the aromatic series and many unsaturated ones. These give a greater carbon yield when burned than do compounds of the paraffin series.

As it is important that the gas be cooled down after the heating, to such a temperature that the pressure is reduced to permit the gas to be readily conducted through the ordinary metal pipes and burned in the ordinary burners, I preferably utilize the untreated gas as the cooling means and utilize the heat of the treated gas for preheating the original gas. In other words, the gas is delivered to and from the heating chamber through a suitable counter-current heat interchanger.

The temperature to which the gas is heated will depend to some extent upon the character of the gas. For natural gas, in which methane forms the principal constituent, the heating may be to about 600° C. to 850° C. If the heating apparatus has nickel or iron walls which exercise a catalytic action on the heated gas, the temperature should be somewhat lower than if the walls are of inert material. In any event it should be close to but below the temperature at which the chemical action in the apparatus employed results in the freeing of carbon. This is because carbon so produced does not have the desired characteristics resulting from flame impingement.

The extent to which the gas is cooled after the heating may be varied, dependent upon the character of the products formed by the heating, and particularly their temperature of condensation. It is desirable that none of the reaction products condense out, but on the contrary travel in gaseous or vapor form to the burners. With methane or marsh gas heated to a temperature of 600° C. to 850° C., the cooling should not be below about 250° C., as at this temperature no reaction products will condense out by the cooling, and all of the constituents of the gas and those formed by the heat treatment of the gas will be conducted to the burners. The details of construction of the apparatus may be varied within wide limits and the apparatus employed for effecting the burning and carbon collection may be those of the standard form now employed.

The apparatus in its preferred form includes a chamber in which the gas is heated to the desired high temperature, an expanding chamber to which the heated gas is delivered, and a counter-current apparatus for delivering the gas to the heater and conducting the gaseous products from the expansion chamber.

In the accompanying drawing there is illustrated in rather diagrammatic form a general arrangement of parts for carrying out my invention.

In the drawing, the single figure is a longitudinal section through the apparatus.

In the apparatus illustrated there is shown the ordinary chamber or building 10 with a channel 11 beneath which is disposed the gas pipe 12 with its burners 13. These burners are so positioned in respect to the metal channel that the flame impinges on the latter and the channel is provided with the usual means for moving it back and forth and for scraping or brushing the carbon therefrom. As these parts form no portion of my invention they have not been illustrated. In this chamber there may also be the supply pipe 14 disposed above the channel or in such position that the gas in the supply pipe is preheated by the waste heat of the combustion at the burners.

For the preheating of the gas there is provided a separate chamber, preferably having two compartments 15 and 16. One of these constitutes a furnace and the other an expansion chamber. In the furnace chamber 15 there is formed a passage 17, preferably of fire brick or other nonmetallic material, and of serpentine or any other desired form, whereby the gas may be heated to the desired extent by the combustion of fuel from a grate 18 or from liquid or gaseous fuel burners. The gas from this conduit or passage 17 is delivered directly to the expansion chamber 16, and from the latter it may flow to the burner pipe 12 through the outer pipe 19 of a counter-current heat interchanger. The supply of gas to be treated and which has been preheated in the pipe 14, may be conducted through a pipe 20 forming the inner pipe of the heat interchanger, and thence through a pipe 21 in the expansion chamber 16 to the inlet end of the conduit 17. The supply of gas through the outer pipe of the heat interchanger, combined with the expansion in the chamber 16, will ordinarily give sufficient cooling effect, although obviously auxiliary cooling means may be employed. It will be noted that the gas is first preheated in the combustion chamber, then further preheated in the heat interchanger and in the expansion chamber, and is brought to the final high temperature in the heating passage 17. The heated gas expands into the chamber 16 and then flows through the heat interchanger to the burner tube 12.

Although there are illustrated only a single burner tube and a single channel 11, it will be noted that the burner tube is shown very much smaller than the tube 19 of the heat interchanger, and in practice a large number of burner tubes may be supplied from the same heating apparatus and its counter-current interchanger.

In case any special reaction product is desired, the heating of the gas may be conducted under such conditions as will result in the formation of the maximum amount of that compound, such for instance as naphthalene and the gas may be cooled to a temperature at which said compound will condense out before the residue is delivered to the burner.

Having thus described my invention, what I claim as new and desire to secure by Letters Patent is:—

1. The process of manufacturing carbon black, which includes heating a hydrocarbon gas to a temperature at which chemical change is effected, but without substantial liberation of free carbon, substantially reducing the pressure and increasing the volume of the heated gas to thereby cool the gas by its expansion, further cooling the same but not to a temperature at which ingredients of the heated gas condense or separate out, burning the gaseous mixture and impinging the flame on a cooling plate.

2. The process of making carbon black which includes heating a hydrocarbon gas to a temperature of between 600° C. and 850° C., expanding the gas to a comparatively large volume, cooling the expanded gas to a temperature of about 250° C., and burning the cooled gas with flame impingement.

3. The process of producing carbon from a flame, which includes heating a hydrocarbon gas to a temperature at which reaction products are formed therein, cooling the gaseous mixture to a temperature above the condensing point of such products, and burning the mixture under conditions resulting in incomplete combustion.

4. The process of securing free carbon, which includes heating a hydrocarbon gas to a temperature resulting in the formation of reaction products, cooling the mixture, and simultaneously preheating the untreated gas by effecting heat interchange, burning the cooled gaseous mixture under conditions resulting in incomplete combustion, and preliminarily heating the untreated gas by the waste heat from said burning.

5. The process of producing carbon black which includes preliminarily heating a hydrocarbon gas, heating the gas to a temperature resulting in the formation of reaction products, expanding the heated gas to comparatively large volume, cooling the expanded gas by heat interchange with the gas after its preliminary heating and before its final heating, the preliminary heating of the gas being such that the cooling is not to a temperature at which products of the final heating condense, and burning the gas and its reaction products with flame impingement, the waste heat of said burning being utilized to effect said preliminary heating.

Signed at New York, in the county of New York and State of New York, this 12th day of January, A. D. 1928.

GEORGE CHARLES LEWIS.